US012665732B2

(12) United States Patent
Rossetti et al.

(10) Patent No.: US 12,665,732 B2
(45) Date of Patent: Jun. 23, 2026

(54) SYSTEMS AND METHODS FOR TIME DIVISION DUPLEX SLOT PATTERN DETERMINATION

(71) Applicant: Verizon Patent and Licensing Inc., Basking Ridge, NJ (US)

(72) Inventors: David Albert Rossetti, Randolph, NJ (US); Sylvestre Demonget, Millburn, NJ (US); Madhusudan Mandyam Bheemarayan, Hillsborough, NJ (US); Anand J. Shah, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 340 days.

(21) Appl. No.: 17/811,726

(22) Filed: Jul. 11, 2022

(65) Prior Publication Data

US 2024/0014994 A1 Jan. 11, 2024

(51) Int. Cl.
*H04L 5/14* (2006.01)
*H04L 5/00* (2006.01)

(52) U.S. Cl.
CPC .............. *H04L 5/14* (2013.01); *H04L 5/0035* (2013.01)

(58) Field of Classification Search
CPC ........ H04L 5/0035; H04L 5/14; H04W 16/26; H04W 72/20; H04W 72/21; H04W 72/54; H04W 76/14; H04W 76/15

USPC ................................ 370/279, 280, 315, 329
See application file for complete search history.

(56) References Cited

U.S. PATENT DOCUMENTS

| | | | |
|---|---|---|---|
| 2013/0242812 A1* | 9/2013 | Khoryaev | H04W 72/21 370/278 |
| 2019/0090222 A1 | 3/2019 | Wu | |
| 2022/0095144 A1* | 3/2022 | Ren | H04W 72/20 |
| 2022/0123915 A1 | 4/2022 | Yoshioka et al. | |
| 2022/0182130 A1* | 6/2022 | Abedini | H04W 72/20 |
| 2023/0062906 A1 | 3/2023 | Hamada | |
| 2023/0063263 A1 | 3/2023 | Hamada | |
| 2023/0142158 A1* | 5/2023 | Sandberg | H04W 72/54 370/280 |
| 2024/0283589 A1 | 8/2024 | Wang | |

* cited by examiner

*Primary Examiner* — Harun Chowdhury

(57) ABSTRACT

In some implementations, a network device may determine that a user equipment (UE) is operating in coverage of a boundary cell associated with overlapping coverage provided by a first cell and a second cell. The network device may determine that a first time division duplex (TDD) slot pattern associated with the first cell differs from a second TDD slot pattern associated with the second cell. The network device may determine a boundary region TDD slot pattern to be used for communications with the UE within the coverage of the boundary cell based on at least one of the first TDD slot pattern or the second TDD slot pattern. The network device may communicate with the UE using the boundary region TDD slot pattern.

20 Claims, 10 Drawing Sheets

400 —

410 — Determine that a user equipment (UE) is operating in a boundary cell

420 — Determine that a first TDD slot pattern associated with a first cell differs from a second TDD slot pattern associated with a second cell 430 — Determine a boundary region TDD slot pattern to be used for communications with the UE 440 — Communicate with the UE using the boundary region TDD slot pattern 410 — Determine that a user equipment (UE) is operating in a boundary cell 420 — Determine that a first TDD slot pattern associated with a first cell differs from a second TDD slot pattern associated with a second cell 430 — Determine a boundary region TDD slot pattern to be used for communications with the UE 440 — Communicate with the UE using the boundary region TDD slot pattern

400

SYSTEMS AND METHODS FOR TIME DIVISION DUPLEX SLOT PATTERN DETERMINATION

BACKGROUND

A user equipment (UE) may establish a connection to a core network via a network device. The UE may communicate with the network device via downlink communications (e.g., communications from the network device to the UE) and uplink communications (e.g., communications from the UE to the network device). In some cases, downlink communications and uplink communications may be scheduled according to a time division duplex (TDD) slot pattern, in which certain symbols and/or slots are dedicated to downlink communications and in which other symbols and/or slots are dedicated to uplink communications.

DETAILED DESCRIPTION OF EXAMPLE EMBODIMENTS

Figure 1A:
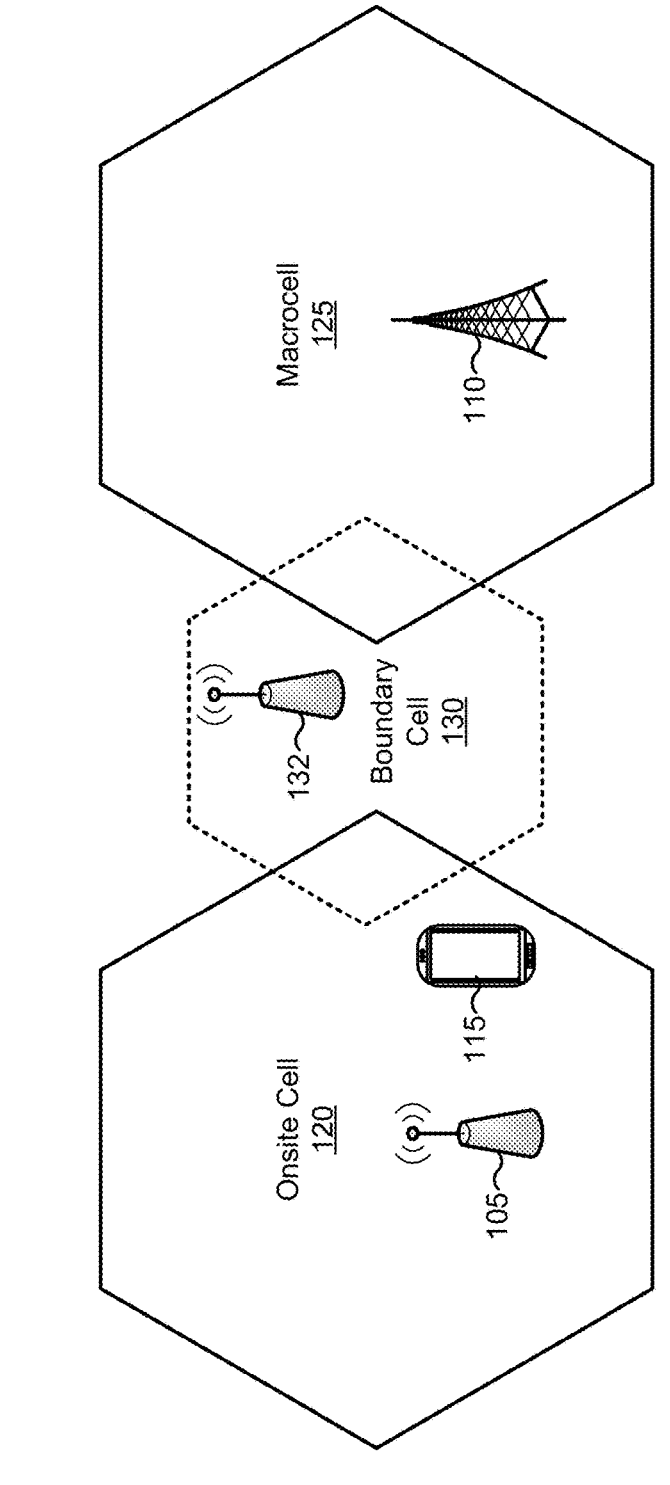
FIGS. 1A-1G are diagrams of an example associated with TDD slot pattern determination.

The following detailed description of example implementations refers to the accompanying drawings. The same reference numbers in different drawings may identify the same or similar elements.

A wireless communication device, such as a user equipment (UE) or a similar device, may communicate with a network device in a wireless network. A network device may include a New Radio (NR) or 5G network device (sometimes referred to as a gNodeB (gNB)), a Long Term Evolution (LTE) or 4G network device (sometimes referred to as an eNodeB (eNB)), or a similar network device. Each network device may provide communication coverage for a particular area, sometimes referred to as a cell. A network device may be capable of providing coverage to a relatively large geographic area, sometimes referred to as a macrocell, or to a smaller area, sometimes referred to as a microcell, a picocell, a femtocell, a private cell, an onsite cell, and/or a similar cell. For example, a macro network device may be associated with a large antenna array and a high transmit power, providing broad coverage to many users within a macrocell, while an onsite network device may be associated with a smaller antenna array and/or a lower transmit power than a macro network device and may provide coverage to a limited number of subscribers located within a particular building, located on a particular premises, or the like.

A UE and a network device may communicate using a time division duplex (TDD) slot pattern, sometimes referred to as a TDD frame structure. More particularly, a transmission timeline for downlink and uplink communications may be partitioned into radio frames (sometimes referred to as just frames), with each frame having a predetermined duration (e.g., 10 milliseconds (ms)) and partitioned into a set of subframes. Each subframe may have a predetermined duration (e.g., 1 ms) and may include a set of slots, with the number of slots in each subframe varying according to a subcarrier spacing used for transmission. Each slot may include a number of orthogonal frequency-division multiplexing (OFDM) symbols (sometimes referred to as just symbols), such as, in some implementations, fourteen symbols. In some cases, certain slots and/or symbols may be dedicated for use as downlink slots and/or symbols (e.g., may be reserved for scheduling downlink communications between a network device and one or more UEs), while certain other slots and/or symbols may be dedicated for use as uplink slots and/or symbols (e.g., may be reserved for granting uplink communications between one or more UEs and a network device).

In some instances, it may be beneficial for an onsite cell or the like to be associated with a different ratio of uplink and downlink traffic than a ratio provided by a macrocell. For example, an onsite cell may be associated with more uplink traffic than a macrocell (e.g., the onsite cell may be considered to be more uplink-centric than a macrocell). Accordingly, it may be beneficial for the onsite cell to operate with a higher ratio of uplink to downlink slots and/or symbols than a ratio of uplink to downlink slots and/or symbols associated with a macrocell. For example, in some cases a macrocell may be associated with a downlink-centric TDD slot pattern sometimes referred to as a 4:1 ratio TDD slot pattern, which may include a repeating pattern of five slots including three downlink slots (e.g., slots in which the associated symbols may be scheduled for downlink communications), one special slot (e.g., a slot which contains a mixture of downlink and uplink symbols, such as ten downlink symbols, a two symbol guard period, and two uplink symbols, among other examples, which is described in more detail below in connection with reference number 142), and one uplink slot (e.g., a slot in which the associated symbols may be scheduled for uplink communications). This 4:1 ratio TDD slot pattern is sometimes referred to as a DDDSU slot pattern, in which "D" used to signify downlink slots, "S" used to signify the special slot, and "U" used to signify the uplink slots. An onsite cell, however, may be associated with an uplink-centric TDD slot pattern sometimes referred to as a 1:1 ratio TDD slot pattern, which may include a repeating pattern of five slots including two downlink slots, one special slot, and two uplink slots. This 1:1 ratio TDD slot pattern is sometimes referred to as a DDSUU slot pattern.

Operating an onsite cell with a different TDD slot pattern than a macrocell may be problematic if the onsite cell is operated within or near a macrocell and is operating in the same or adjacent spectrum. This is because interference may occur at a boundary region between the two cells (e.g., an area in which coverage from the onsite cell overlaps with coverage from the macrocell). More particularly, UEs operating in a boundary region between the two cells may experience degraded performance due to uplink/downlink collisions in overlapping slots or symbols from the different systems. Thus, typically an onsite cell operating near or within a macrocell will operate using the same TDD slot pattern as the neighboring macrocell in order to avoid uplink/downlink collisions and similar interference within a boundary region. As a result, the onsite cell is operated with a suboptimal TDD slot pattern (e.g., using less uplink slots or symbols than would otherwise be ideal), leading to increased latency, decreased throughput, and overall inefficient usage of network resources.

Some implementations described herein enable the use of different TDD slot patterns in neighboring and/or overlapping cells, such as an onsite cell and a macrocell. In some implementations, an onsite cell may operate with an uplink-centric TDD slot pattern, such as a 1:1 ratio slot pattern or the like, and the macrocell may operate with a downlink-centric TDD slot pattern, such as a 4:1 ratio slot pattern or the like. In order to avoid uplink/downlink collisions and similar performance degradation within a boundary region of overlapping coverage provided by the two cells, a boundary cell may be implemented between the onsite cell and the macrocell that employs a TDD slot pattern aimed at minimizing interference between onsite cell communications and macrocell communications. More particularly, a network device may determine when a UE is operating in the coverage of boundary cell, and the network device may schedule communications in the coverage of the boundary cell by avoiding slots or symbols in which uplink slots or symbols of the onsite cell TDD slot pattern overlap with downlink slots or symbols of the macrocell TDD slot pattern (sometimes referred to as contention slots and/or symbols). Put another way, the network device may sacrifice the contention slots and/or symbols within the coverage of the boundary cell in order to avoid conflict between uplink and downlink communications. As a result, the onsite cell and the macrocell may implement an optimized TDD slot pattern for the respective cell's traffic, such as an uplink-centric TDD slot pattern for the onsite cell and a downlink-centric TDD slot pattern for the macrocell, while avoiding uplink/downlink collisions and similar interference in the boundary region, resulting in decreased latency, increased throughput, decreased communication error rates, and overall more efficient usage of network resources. This may be better understood with reference to the following figures.

FIGS. 1A-1G are diagrams of an example 100 associated with TDD slot pattern determination. As shown in FIGS. 1A-1G, example 100 includes multiple network devices, such as an onsite network device 105 and a macro network device 110, and a UE 115.

As shown in FIG. 1A, various network devices may provide coverage to UEs or similar devices as part of a wireless network. More particularly, in the depicted example, the onsite network device 105 may be associated with an onsite cell 120, and the macro network device 110 may be associated with a macrocell 125. As described above, the onsite network device 105 may be associated with a microcell, a picocell, a femtocell, an onsite cell, a private cell, and/or a similar cell that provides coverage to a relatively small number of subscribers within a building, on a certain premises, or the like, while the macro network device 110 may be associated with the macrocell 125 that provides coverage to a broad geographic area and to a relatively large number of subscribers.

In some implementations, coverage provided by the onsite cell 120 may at least partially overlap with coverage provided by the macrocell 125. For example, in a boundary region provided between the onsite cell 120 and the macrocell 125, coverage provided by the onsite cell 120 may overlap with coverage provided by the macrocell 125. Put another way, the UE 115 or another device may be capable of communicating with both the onsite network device 105 and the macro network device 110 when in the boundary region. As described above, in aspects in which a TDD slot pattern associated with the onsite cell 120 differs from a TDD slot pattern associated with the macrocell 125, there is a risk of colliding communications within the boundary region. According, in some implementations, a boundary cell 130 provides coverage to UEs 115 when in a boundary region between the onsite cell 120 and the macrocell 125. The boundary cell 130 may be associated with a TDD slot pattern that minimizes interference that may otherwise be caused in the boundary region by the different TDD slot patterns used in the onsite cell 120 and the macrocell 125, which is described in more detail, below. In some aspects, one of the onsite network device 105 or the macro network device 110 may serve the boundary cell 130, while, in some other aspects, another network device may serve the boundary cell 130, such as network device 132. In some implementations, network device 132 may be a gNB, an eNB, or a similar network device. In some other implementations, network device 132 may be a repeater device, such as a smart repeater or the like, which is described in more detail below.

As further shown in FIG. 1A, one of the onsite network device 105 or the macro network device 110 may provide coverage to the UE 115. More particularly, in the example depicted in FIG. 1A, the UE 115 is located within the onsite cell 120. In this way, the UE 115 may be connected to a core network or the like via the coverage provided by the onsite network device 105 (e.g., via the onsite cell 120). In that regard, the UE 115 may communicate with the onsite network device 105 using a first TDD slot pattern associated with the onsite network device 105 and/or the onsite cell 120. In some implementations, the onsite cell 120 may be associated with an uplink-centric TDD slot pattern, which may differ from a TDD slot pattern associated with the macro network device 110 and/or the macrocell 125, as described above. For example, the onsite cell 120 may be associated with a 1:1 ratio TDD slot pattern (e.g., a DDSUU slot pattern), as described above. This may be more readily understood with reference to FIG. 1B.

Figure 1B:
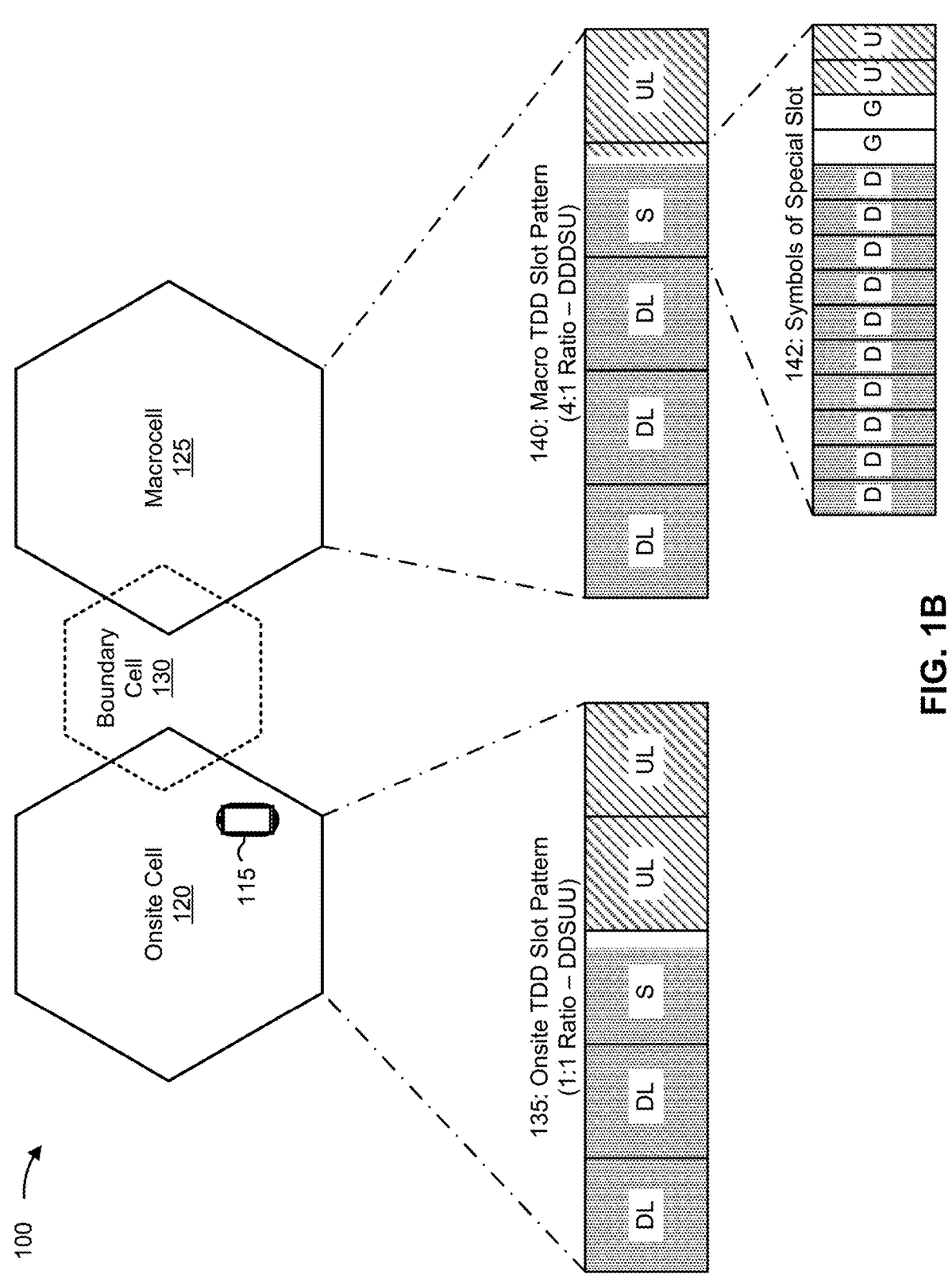

As shown in FIG. 1B, the onsite cell 120 may be associated with a first TDD slot pattern (sometimes referred to as an onsite TDD slot pattern) 135. In the depicted example, the onsite TDD slot pattern 135 is an uplink-centric slot pattern, and, more particularly, is a 1:1 ratio TDD slot pattern (e.g., a DDSUU slot pattern). However, in some other implementations, the onsite TDD slot pattern 135 may differ from the specific combination of uplink, downlink, and special slots shown in FIG. 1B without departing from the scope of the disclosure. As shown using stippling in FIG. 1B, the first two slots of the repeating five-slot pattern may be reserved for downlink communications or otherwise associated with downlink communications (and thus, as shown, may be referred to as downlink, or "DL," slots). Put another way, each of the first two slots may include a number (e.g., fourteen) of OFDM symbols (which is be described in more detail in connection with reference number 142), and the symbols in each of the first two slots may be scheduled for downlink communications. The third slot of the repeating five-slot pattern may be a special slot. As described, a special slot may contain a mixture of downlink and uplink symbols. In some implementations, however, the special slot may nonetheless include more downlink symbols than uplink symbols (e.g., the special slot may include ten downlink symbols, a two symbol guard period, and two uplink symbols, as shown by reference number 142, among other examples), and thus the special slot associated with the onsite TDD slot pattern 135 is also shown using stippling in FIG. 1B to signify that the special slot is a downlink-centric slot. Moreover, a portion of the special slot in the onsite TDD slot pattern 135 is left blank (e.g., is shown with neither stippling nor cross-hatching), which may correspond to one or more symbols comprising a guard band separating downlink communications and uplink communications. As shown using cross-hatching in FIG. 1B, the final two slots of the repeating five-slot pattern may be reserved for uplink communications or otherwise associated with uplink communications (and thus, as shown, may be referred to as uplink, or "UL," slots). Put another way, the symbols in each of the final two slots may be granted to the UE 115 to be used for uplink communications.

As further shown in FIG. 1B, the macrocell 125 may be associated with a second TDD slot pattern, sometimes referred to as a macro TDD slot pattern 140, which may be different from the onsite TDD slot pattern 135. In the depicted example, the macro TDD slot pattern 140 is a downlink-centric slot pattern, and, more particularly, is a 4:1 ratio TDD slot pattern (e.g., a DDDSU slot pattern). However, in some other implementations, the macro TDD slot pattern 140 may differ from the specific combination of uplink, downlink, and special slots shown in FIG. 1B without departing from the scope of the disclosure. In this example, the first three slots of the repeating five-slot pattern may be reserved for downlink communications or otherwise associated with downlink communications. The fourth slot of the repeating five-slot pattern may be a special slot. As shown by reference number 142, the special slot may include a number (e.g., fourteen) of OFDM symbols, with a majority of the symbols being downlink symbols. More particularly, as shown using stippling and labeled with "D," the first ten symbols of the special slot associated with the macro TDD slot pattern 140 may be downlink symbols, but the special slot may also include one or more symbols used as a guard band (such as the two symbols shown with no stippling or cross-hatching and labeled with "G") and/or uplink symbols (such as the two symbols shown using cross-hatching and labeled with "U"). And the final slot of the repeating five-slot pattern may be reserved for uplink communications or otherwise associated with uplink communications.

When the UE 115 is within one coverage area, but not within the coverage of the boundary cell 130, the UE 115 may communicate using the onsite TDD slot pattern 135 or the macro TDD slot pattern 140 with little risk of colliding communications and similar interference. For example, as shown in FIG. 1B, the UE 115 is within the onsite cell 120, and is not within the coverage of the boundary cell 130 or the macrocell 125. In some aspects, a UE 115 may determine that it is within one cell (e.g., the onsite cell 120 or the macrocell 125) and not the boundary cell 130 by detecting and/or receiving control signaling, broadcast singling, or the like applicable to one of the onsite cell 120 or the macrocell 125 without detecting or receiving any such control signaling, broadcast singling, or the like applicable to the other one of the onsite cell 120 or the macrocell 125 and/or applicable to the boundary cell 130. In such implementations, the UE 115 may communicate with the onsite network device 105 using the onsite TDD slot pattern 135. In this way, the onsite network device 105 may implement an uplink-centric TDD slot pattern, which may be more reflective of typical traffic within the onsite cell 120. As the UE 115 moves into overlapping coverage, however, such as within the coverage of the boundary cell 130, there is more risk of colliding communications. This may be more readily understood with reference to FIG. 1C.

Figure 1C:
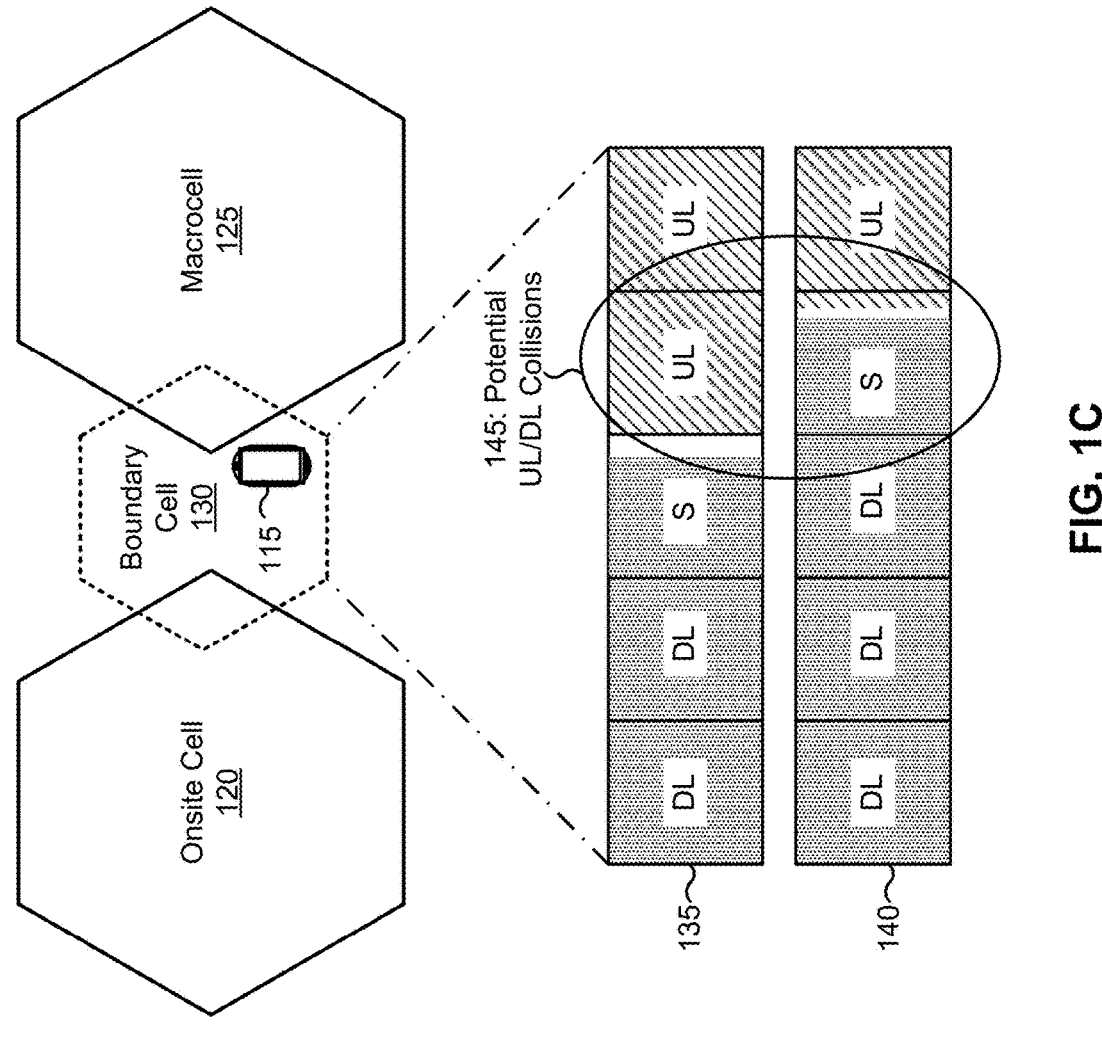

As shown in FIG. 1C, the UE 115 is within the coverage of the boundary cell 130, which may be associated with an area of overlapping coverage provided by the onsite cell 120 and the macrocell 125. Put another way, when the UE 115 is within the coverage of the boundary cell 130, the UE 115 may be capable of communicating with both the onsite network device 105 and the macro network device 110. As described above, this may potentially result in uplink/downlink collisions and other interference or service degradation.

More particularly, as shown by reference number 145, when the UE 115 is within the coverage of the boundary cell 130 there are potential uplink/downlink collisions in the fourth slot of the five-slot repeating pattern of the onsite TDD slot pattern 135 and the macro TDD slot pattern 140. More particularly, the UE 115 or another device may attempt to transmit an uplink communication to the onsite network device 105 at a same time (e.g., within a same slot) that the macro network device 110 is transmitting a downlink communication, either to the UE 115 or to another device, which may collide and result in performance degradation. Accordingly, in some aspects, communications between the UE 115 and one of the network devices 105, 110, 132 may be selectively scheduled in an effort to avoid uplink/downlink collisions within a contention slot or symbol, which may be more readily understood with reference to FIG. 1D.

Figure 1D:
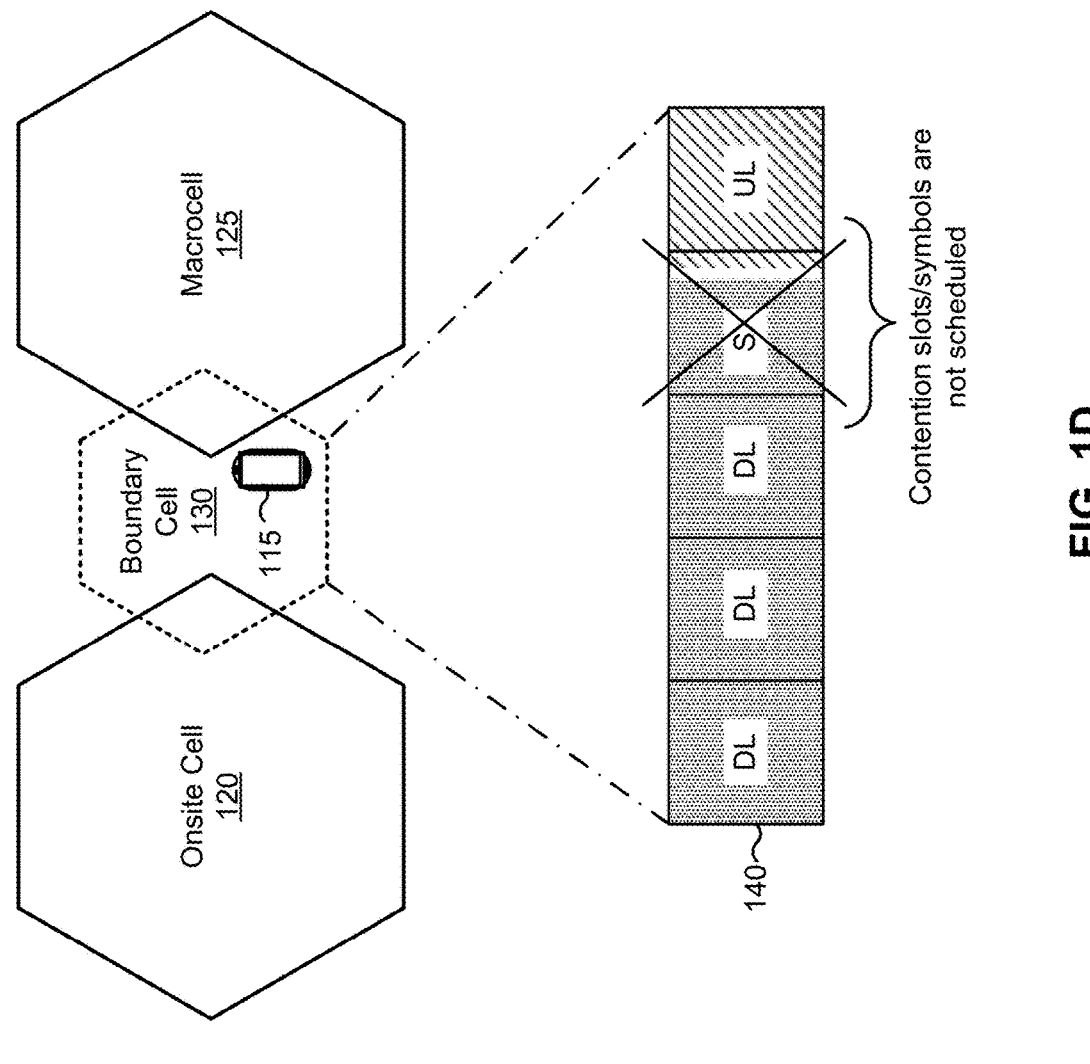

As shown in FIG. 1D, in some implementations, when the UE 115 is within the coverage of the boundary cell 130, the UE 115 may communicate using one of the onsite TDD slot pattern 135 or the macro TDD slot pattern 140, but one or more contention slots or symbols may not be granted or scheduled in order to avoid uplink/downlink collisions, or the like. More particularly, in some aspects, a network device (e.g., one of the onsite network device 105, the macro network device 110, the network device 132, or another network device such as another gNB or another eNB) may determine that the UE 115 is operating in a boundary region associated with overlapping coverage provided by the macrocell 125 and the onsite cell 120. For example, the network device may determine that the UE 115 is operating within the coverage of the boundary cell 130, as shown in FIG. 1D. Moreover, the network device may determine that a first TDD slot pattern associated with the macrocell 125 (e.g., the macro TDD slot pattern 140) differs from a second TDD slot pattern associated with the onsite cell 120 (e.g., the onsite TDD slot pattern 135).

Accordingly, the network device may determine a boundary region TDD slot pattern to be used for communications with the UE 115 within the coverage of the boundary cell 130 based on at least one of the first TDD slot pattern or the second TDD slot pattern. More particularly, in some implementations, at least one uplink symbol of one of the first TDD slot pattern or the second TDD slot pattern overlaps with at least one downlink symbol of the other one of the first TDD slot pattern or the second TDD slot pattern, as described in connection with reference number 145 in FIG. 1C. Accordingly, the network device may determine a boundary region TDD slot pattern to be used in order to avoid uplink/downlink collisions in the contention slots or symbols. More particularly, when communicating with the UE 115 using the boundary region TDD slot pattern, the network device may not grant an uplink communication in the at least one uplink symbol (e.g., the at least one contention symbol) and/or may not schedule a downlink communication in the at least one downlink symbol. In this way, the network device may sacrifice capacity in the boundary region in an effort to avoid conflict. For example, in networks implementing the onsite TDD slot pattern 135 and the macro TDD slot pattern 140 described above, when a device (e.g., the UE 115) moves from the onsite cell 120 to the boundary cell 130, the device may lose 50% uplink capacity because the first uplink slot of the onsite TDD slot pattern 135 may no longer be granted in coverage of the boundary cell 130. Conversely, when a device moves from the boundary cell 130 to the onsite cell 120, the device may gain 100% uplink capacity because a previously unscheduled or granted slot (e.g., the fourth slot of the five-slot repeating pattern)

may then be granted as an uplink slot. Similarly, when a device moves from the macrocell 125 to the boundary cell 130, the device may lose 25% of its downlink capacity because the last downlink slot of the macro TDD slot pattern 140 may no longer be granted in the coverage of the boundary cell 130. Conversely, when a device moves from the boundary cell 130 to the macrocell 125, the device may gain 33% downlink capacity because a previously unscheduled or granted slot (e.g., the fourth slot of the five-slot repeating pattern) may then be scheduled as a downlink slot.

In some implementations, the network device may implement the above-described boundary region TDD slot pattern within the coverage of the boundary cell 130 even when there is little risk of collisions at a particular UE (e.g., UE 115), such as when there are other UEs within the coverage of the boundary cell 130 that are at risk of experiencing colliding communications. More particularly, in some implementations, due to a particular location of the UE 115 within the coverage of the boundary cell, UE-specific implementations, UE capabilities, or the like, the UE 115 may be capable of communicating in the coverage of the boundary cell 130 using one of the onsite TDD slot pattern 135 or the macro slot pattern 140 with little risk of colliding communications. Nonetheless, if multiple UEs are being served within the coverage of the boundary cell 130, with at least one of the UEs being at risk of experiencing colliding communications, the network device may implement a modified TDD slot pattern (e.g., the boundary region TDD slot pattern) within the coverage of the boundary cell 130, thereby serving all UEs within the cell using the modified TDD slot pattern (including, in this example, the UE 115 which is at little risk of experiencing colliding communications). Put another way, in some implementations, even if the UE 115 would face no issues using one of the onsite TDD slot pattern 135 or the macro TDD slot pattern 140 in the coverage of the boundary cell 130, the boundary region TDD slot pattern may be dictated by other UEs in different parts of the boundary cell 130. In that regard, in some implementations, the network device may determine that one or more additional UEs are operating in the coverage of the boundary cell 130, and thus may further determine the boundary region TDD slot pattern to be used for communications with the UE 115 within the coverage of the boundary cell 130 based on the one or more additional UEs operating in the coverage of the boundary cell.

In some implementations, the boundary region TDD slot pattern may be the same as one of the first TDD slot pattern or the second TDD slot pattern (e.g., may be the same as either the onsite TDD slot pattern 135 or the macro TDD slot pattern 140). For example, as shown in FIG. 1D, the network device may communicate with the UE 115 using the macro TDD slot pattern 140. Put another way, the slot pattern depicted in FIG. 1D is the same TDD slot pattern associated with the macrocell 125. In such implementations, the network device may not schedule communications in certain downlink slots or symbols that overlap with uplink slots or symbols of the onsite TDD slot pattern 135. For example, as shown using an X through the special slot, which includes downlink symbols that overlap with uplink symbols of the onsite TDD slot pattern 135, the network device may not schedule any downlink communications in the special slot in order to avoid collisions with uplink communications from various UEs or other devices communicating with the onsite network device 105.

Figure 1E:
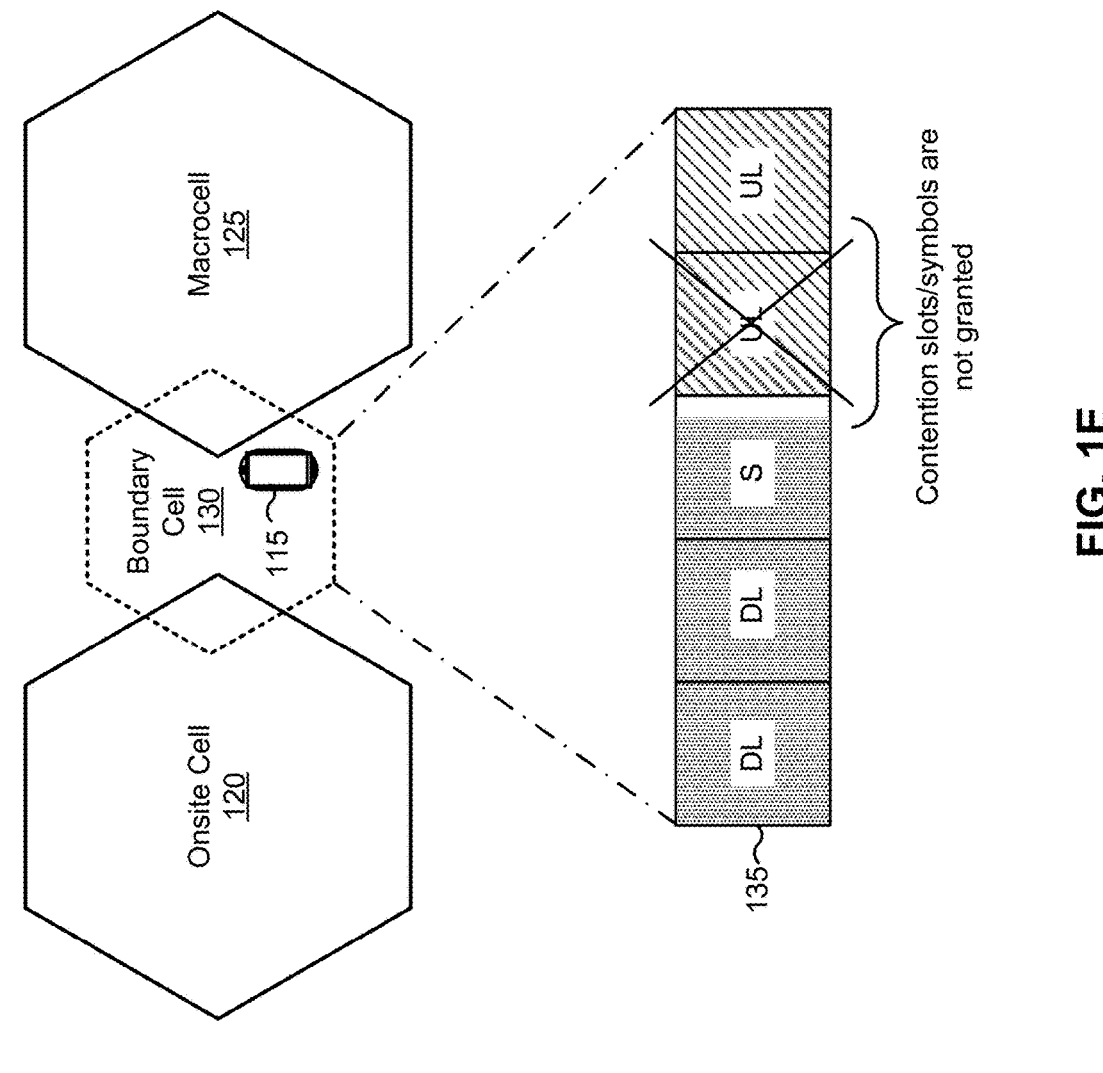

Alternatively, as shown in FIG. 1E, the network device may communicate with the UE 115 using the onsite TDD slot pattern 135. Put another way, the slot pattern depicted in FIG. 1E is the same TDD slot pattern associated with the onsite cell 120. In such implementations, the network device may not grant certain uplink slots or symbols that overlap with downlink slots or symbols of the macro TDD slot pattern 140. For example, as shown using an X through the first uplink slot, which includes uplink symbols that overlap with downlink symbols of the macro TDD slot pattern 140, the network device may not grant any symbols in the fourth slot for use for uplink communications in order to avoid collisions with downlink communications from the macro network device 110 to various UEs or other devices.

Figure 1F:
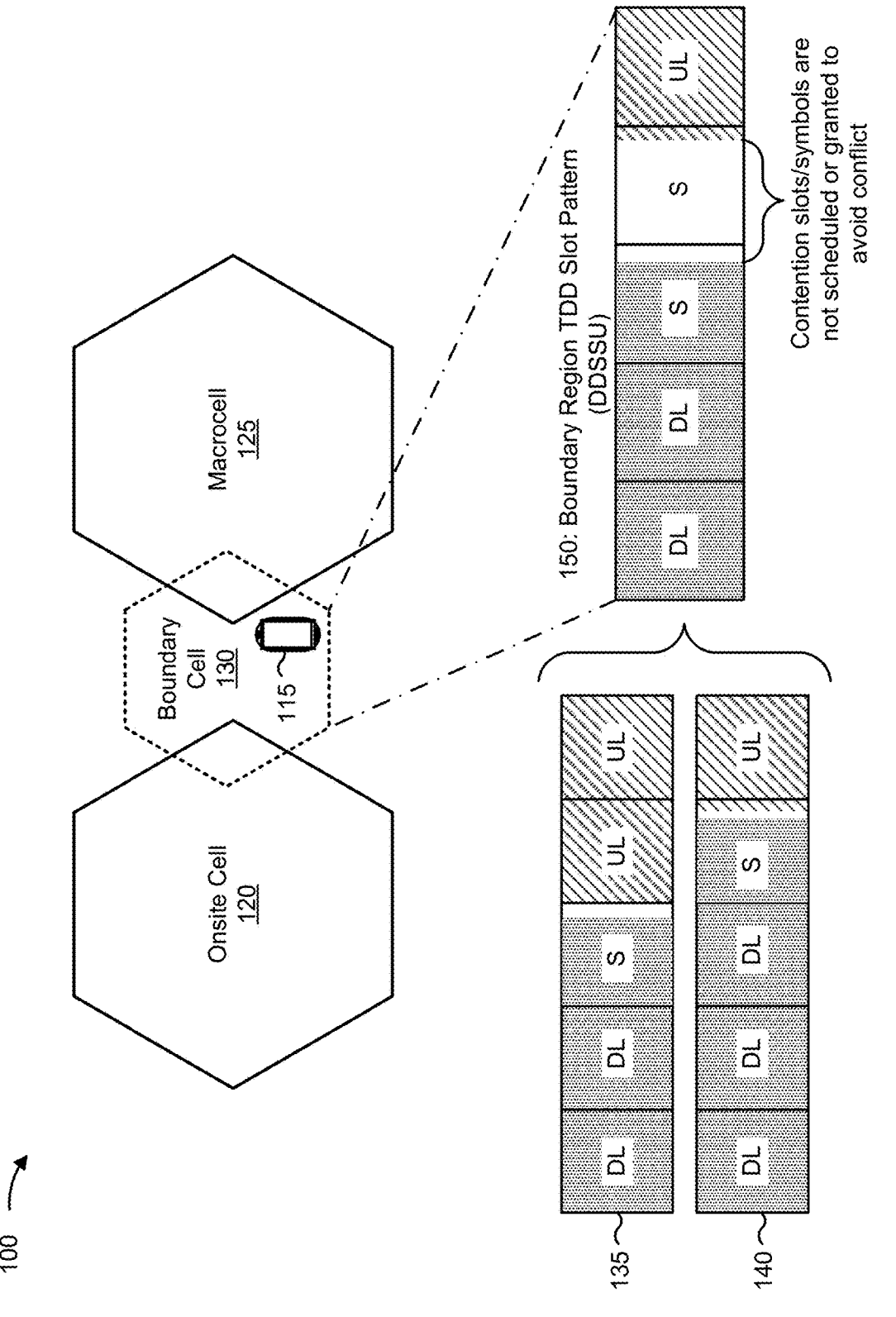

In some implementations, when the UE 115 is within the boundary region (e.g., the boundary cell 130), the network device may communicate with the UE 115 using a different TDD slot pattern from the first TDD slot pattern and the second TDD slot pattern. For example, as shown in FIG. 1F, the network device may communicate with the UE 115 using a first boundary region TDD slot pattern 150, or the like. The first boundary region TDD slot pattern 150 may include a different pattern than the first TDD slot pattern and the second TDD slot pattern (e.g., the onsite TDD slot pattern 135 and the macro TDD slot pattern 140). More particularly, in the depicted example, the first boundary region TDD slot pattern 150 may include two downlink slots, two special slots, and one uplink slot (e.g., the first boundary region TDD slot pattern 150 may include a five-slot repeating pattern of DDSSU). Moreover, in some aspects, symbols in one or more of the special slots may not be scheduled and/or may not be granted in order to avoid uplink/downlink collisions in contention slots and/or symbols. For example, as shown in FIG. 1F, portions of the both the first special slot and the second special slot are not scheduled or granted in order to avoid uplink/downlink collisions, essentially creating a large guard band between the last scheduled downlink symbol and the first granted uplink symbol in the first boundary region TDD slot pattern 150.

Figure 1G:
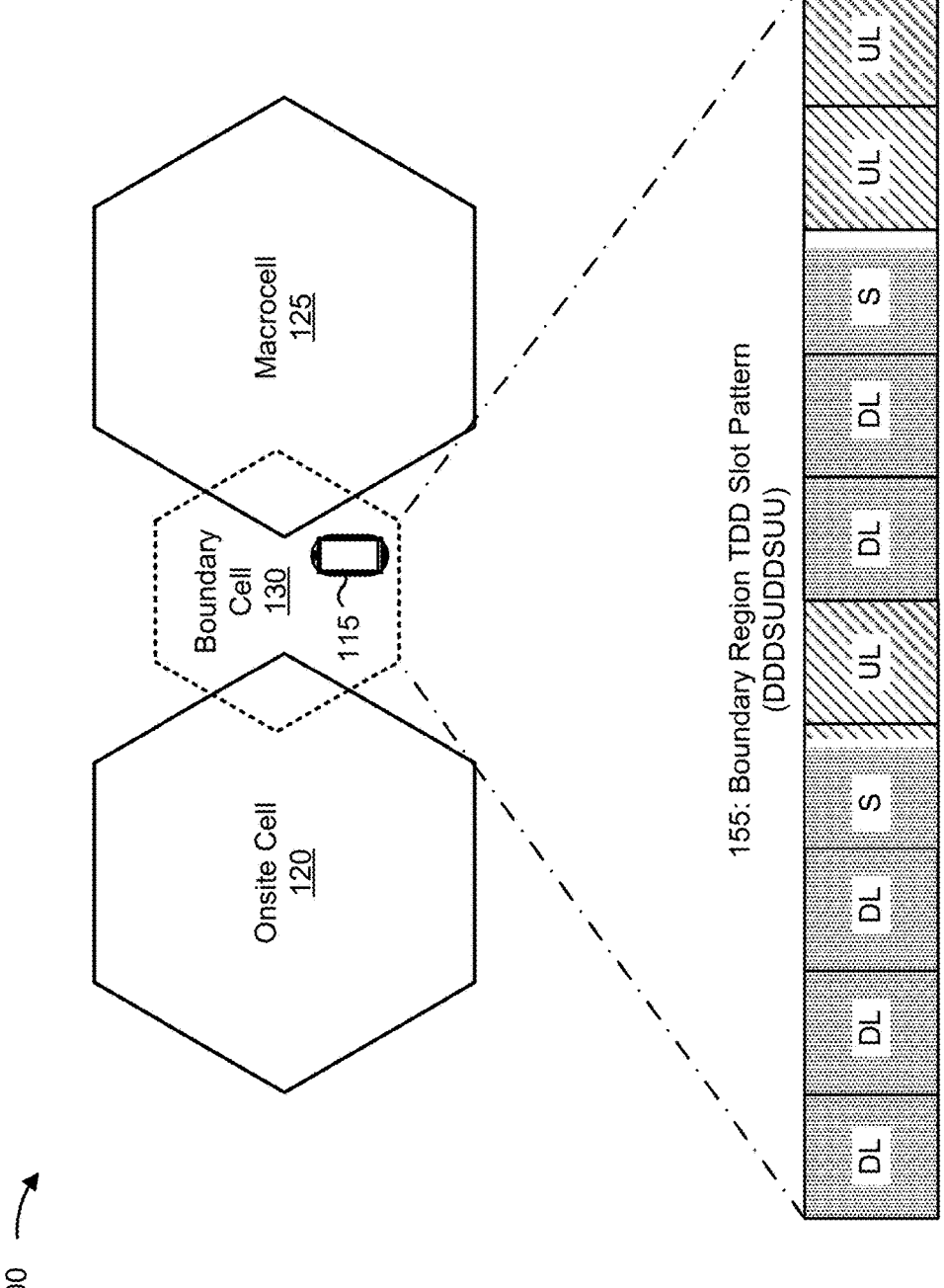

In some implementations, a boundary TDD slot pattern may be based on a combination of the first TDD slot pattern (e.g., the macro TDD slot pattern 140) and the second TDD slot pattern (e.g., the onsite TDD slot pattern 135). For example, as shown in FIG. 1G, a second boundary region TDD slot pattern 155 includes a ten-slot repeating pattern of DDDSUDDSUU. The second boundary region TDD slot pattern 155 may be a combination of the onsite TDD slot pattern 135 and the macro TDD slot pattern 140 in that the first five slots (e.g., DDDSU) correspond to the 4:1 ratio macro TDD slot pattern 140 and the second five slots (e.g., DDSUU) correspond to the 1:1 ratio onsite TDD slot pattern 135. In some implementations, the network device may operate using the second boundary region TDD slot pattern 155, and thereafter may not schedule and/or grant certain slots or symbols when needed and/or when collisions arise. For example, the network device may operate using the second boundary region TDD slot pattern 155 (e.g., DDDSUDDSUU), but in response to later determining that collisions occur within the fourth and/or ninth slots thereof (either at the UE 115 and/or at another UE operating in the coverage of the boundary cell 130), the network device may thereafter refrain from scheduling and/or granting certain slots or symbols in the fourth and/or ninth slots (in a similar manner as described in connection with FIGS. 1D and 1E, respectively) in order to avoid conflict in those slots and/or symbols.

In some implementations, the network device may determine that the UE 115 is operating within the boundary region (e.g., that the UE 115 is within the coverage of the boundary cell 130) based on a location of the UE 115, based on signaling from the UE 115, and/or based on signaling from another device. For example, in some implementations, the boundary region may be statically determined. More particularly, one or more of the network devices (e.g., the onsite network device 105, the macro network device 110, and/or a similar network device) may be pre-provisioned with a site plan or the like, which indicates certain areas of overlapping coverage and/or certain areas in which a boundary region TDD slot pattern should be utilized. Accordingly, based on detecting that a location of the UE 115 is within an area of overlapping coverage (e.g., is within the coverage of the boundary cell 130), a network device may implement one of the TDD slot patterns described in connection with FIGS. 1D-1G, or a similar TDD slot pattern.

In some other implementations, the boundary region may be dynamically determined. For example, in some implementations, a receiver within a cell (e.g., a receiver at the onsite network device 105 and/or the macro network device 110) may listen for various signals, determine a hearable pattern at a site, and adjust into a boundary region TDD slot pattern, as appropriate. In some other implementations, a receiver may be located at the UE 115, which may then, in response to hearing multiple transmission patterns, signal an indication to a network device 105, 110 that the UE 115 is within the boundary region. In some implementations, one network device (e.g., one of the onsite network device 105 or the macro network device 110) may signal to another network device (e.g., the other one of the onsite network device 105 or the macro network device 110) that a UE 115 is within a boundary region, such as via an Xn communication protocol and/or other inter-network-device communication protocol. For example, if an onsite network device 105 determines that a UE 115 is within a boundary region, the onsite network device 105 may signal, to the macro network device 110, that the UE 115 is within the boundary region, and thus the macro network device 110 may thereafter schedule and grant downlink and uplink resources according to a boundary region TDD slot pattern, or the like.

In some other implementations, an external device (e.g., network device 132) may determine that the UE 115 is within a boundary region, and thus the external device may signal an indication that the UE 115 is within the boundary region to one of the network devices 105, 110. In some implementations, the external device may be a smart repeater device, or the like. In some aspects, a smart repeater device may be capable of listening for and/or determining transmission patterns (e.g., uplink and downlink patterns), and thus may transmit communications (e.g., repeat communications) when the communications will cause the least interference with other devices' transmissions. In such implementations, a smart repeater may be capable of determining that a UE 115 is within the boundary region by listening to the various transmissions or otherwise, and thus may signal to one or more of the network devices 105, 110 that the UE 115 is within a boundary region using an inter-gNB communication protocol or a similar communication protocol, such as by utilizing an over-the-air control channel between a donor gNB and a subtending smart repeater used to transmit control information, sometimes referred to as Side Control Information. Moreover, in some implementations, the boundary region may be dynamically determined using an artificial intelligence (AI) algorithm, or the like, which may optimally determine whether a TDD slot pattern adjustment is necessary and/or an optimal TDD slot pattern to implement in order to best avoid uplink/downlink collisions, or the like.

Although the above examples are described in connection with a single boundary region (e.g., the boundary cell 130), aspects of the disclosure are not so limited. In some other implementations, there may be multiple boundary cells, and each boundary cell may be associated with a different boundary region TDD slot pattern. For example, when the UE 115 is within the coverage of the boundary cell 130 (e.g., when the UE 115 is in a connected state in the coverage of the boundary cell 130), the network device servicing the boundary cell 130 may operate with a first TDD slot pattern (such as the macro TDD slot pattern 140, as described in connection with FIG. 1D), when the UE 115 is within a second boundary cell, a network device serving the second boundary cell may operate with a second TDD slot pattern (such as the onsite TDD slot pattern 135, as described in connection with FIG. 1E), when the UE 115 is within a third boundary cell, a network device servicing the third boundary cell may operate with a third TDD slot pattern (such as the first boundary region TDD slot pattern 150, as described in connection with FIG. 1D), when the UE 115 is within a fourth boundary cell, a network device servicing the fourth boundary cell may operate with a fourth TDD slot pattern (such as the second boundary region TDD slot pattern 155, as described in connection with FIG. 1G), and so forth. Accordingly, in some implementations, the network device (e.g., one of the onsite network device 105 and the macro network device 110) may determine that the UE 115 is operating in another boundary cell associated with the overlapping coverage provided by the network device and another network device (e.g., the other of the onsite network device 105 and the macro network device 110), may determine another boundary region TDD slot pattern to be used for communications with the UE 115 based on at least one of the first TDD slot pattern or the second TDD slot pattern with the other boundary region TDD slot pattern being different than the boundary region TDD slot pattern, and may communicate with the UE 115 using the other boundary region TDD slot pattern.

Accordingly, aspects of the disclosure enable the use of optimized TDD slot patterns in various coverage areas or cells, such as uplink-centric TDD slot patterns in onsite cells and downlink-centric TDD in macrocells, while avoiding uplink/downlink collisions within coverage of a boundary cell between the cells. This may result in decreased latency, increased throughput, decreased communication error rates, and overall more efficient usage of network resources, as described.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
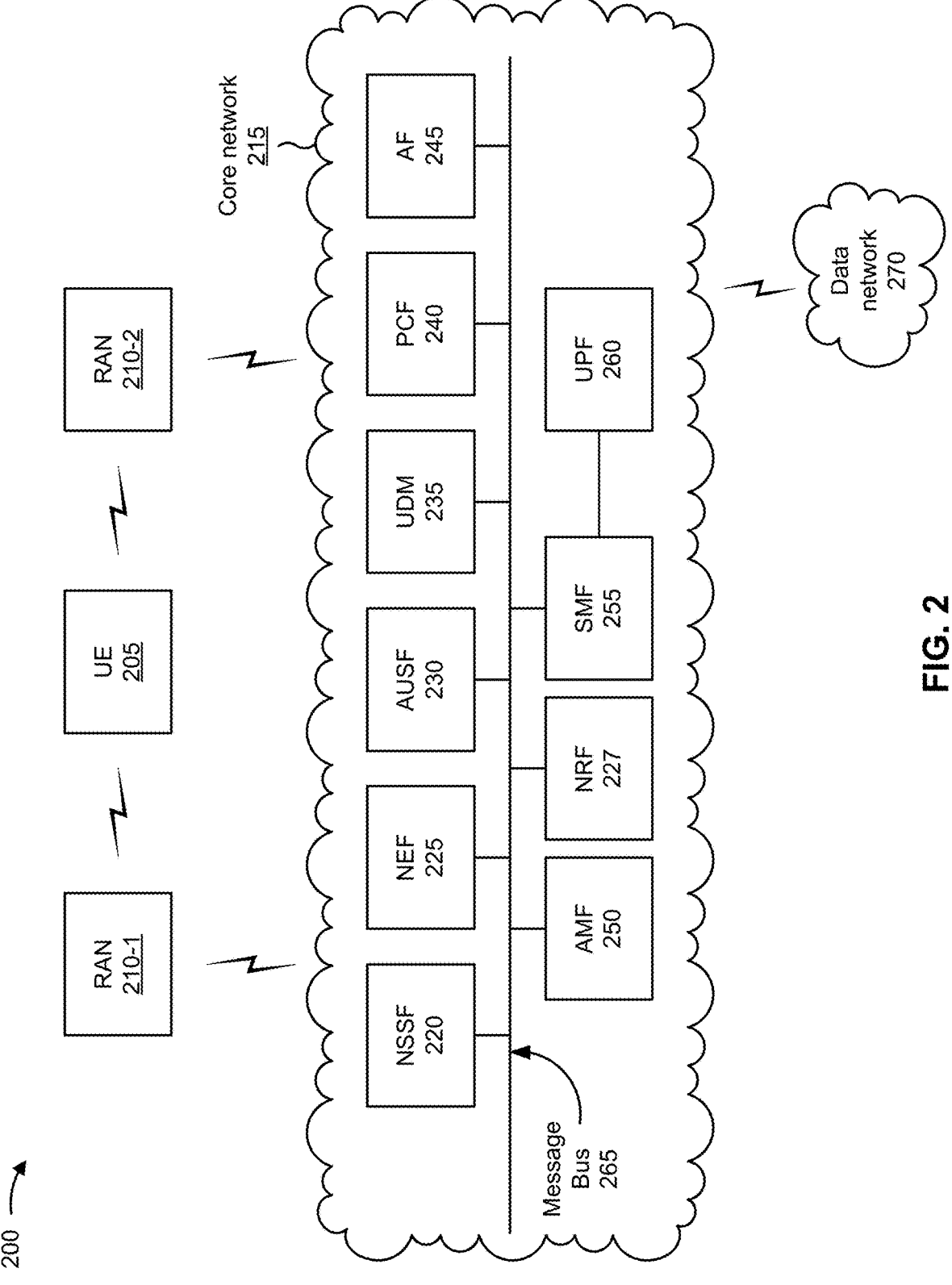
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 205 (e.g., UE 115), a first and second radio access network (RAN) 210-1, 210-2 (with each RAN 210-1, 210-2 being associated with one of an onsite network device 105, a macro network device 110, or a similar RAN entity), a core network 215, and a data network 270. Devices and/or networks of example environment 200 may interconnect via wired connections, wireless connections, or a combination of wired and wireless connections. Although for ease of description only a single core network 215 is shown in FIG. 2, embodiments of the disclosure are not so limited. In some other implementations, a RAN (e.g., RAN 210-1 and/or 210-2) may be in communication with multiple core networks. For example, an onsite or private network may be associated with two core networks (e.g., a private core network and a public core network).

UE 205 includes one or more devices capable of receiving, generating, storing, processing, and/or providing information, such as information described herein. For example, UE 205 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RANs 210-1, 210-2 may support, for example, a cellular radio access technology (RAT). RANs 210-1, 210-2 may include one or more base stations (e.g., base transceiver stations, radio base stations, node Bs, eNBs, gNBs, base station subsystems, cellular sites, cellular towers, access points, transmit receive points (TRPs), radio access nodes, macrocell base stations, microcell base stations, picocell base stations, femtocell base stations, repeaters, or similar types of devices) and other network entities that can support wireless communication for UE 205. RANs 210-1, 210-2 may transfer traffic between UE 205 (e.g., using a cellular RAT), one or more base stations (e.g., using a wireless interface or a backhaul interface, such as a wired backhaul interface), and/or core network 215. RANs 210-1, 210-2 may provide one or more cells that cover geographic areas. In some implementations, one of the first RAN 210-1 or the second RAN 210-2 may be associated with the onsite network device 105 and/or the onsite cell 120, while the other one of the first RAN 210-1 or the second RAN 210-2 is associated with the macro network device 110 and/or the macrocell 125.

In some implementations, RANs 210-1, 210-2 may perform scheduling and/or resource management for UE 205 covered by a RAN 210-1, 210-2 (e.g., UE 205 covered by a cell provided by a RAN 210-1, 210-2). In some implementations, RANs 210-1, 210-2 may be controlled or coordinated by a network controller, which may perform load balancing, network-level configuration, and/or other operations. The network controller may communicate with RANs 210-1, 210-2 via a wireless or wireline backhaul. In some implementations, RANs 210-1, 210-2 may include a network controller, a self-organizing network (SON) module or component, or a similar module or component. In other words, RANs 210-1, 210-2 may perform network control, scheduling, and/or network management functions (e.g., for uplink, downlink, and/or sidelink communications of UE 205 covered by a RAN 210-1, 210-2).

In some implementations, core network 215 may include an example functional architecture in which systems and/or methods described herein may be implemented. For example, core network 215 may include an example architecture of a fifth generation (5G) next generation (NG) core network included in a 5G wireless telecommunications system. While the example architecture of core network 215 shown in FIG. 2 may be an example of a service-based architecture, in some implementations, core network 215 may be implemented as a reference-point architecture and/or a 4G core network, among other examples.

As shown in FIG. 2, core network 215 may include a number of functional elements, sometimes referred to as network function (NF) devices. The functional elements may include, for example, a network slice selection function (NSSF) 220, a network exposure function (NEF) 225, a network repository function (NRF) 227, an authentication server function (AUSF) 230, a unified data management (UDM) component 235, a policy control function (PCF) 240, an application function (AF) 245, an access and mobility management function (AMF) 250, a session management function (SMF) 255, and/or a user plane function (UPF) 260, among other examples. These functional elements may be communicatively connected via a message bus 265 or service-based architecture transport network. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 220 includes one or more devices that select network slice instances for UE 205. By providing network slicing, NSSF 220 allows an operator to deploy multiple substantially independent end-to-end networks potentially with the same infrastructure. In some implementations, each slice may be customized for different services.

NEF 225 includes one or more devices that support exposure of capabilities and/or events in the wireless telecommunications system to help other entities in the wireless telecommunications system discover network services. For example, in some implementations, NEF 225 may expose a TDD slot structure currently in use by a device.

NRF 227 includes one or more devices that may provide a discovery function for NF devices. An NF device may send registration information to NRF 227, and NRF 227, in response to receiving a query concerning a locality from a different NF device, may send NF device information to the different NF device.

AUSF 230 includes one or more devices that act as an authentication server and support the process of authenticating UE 205 in the wireless telecommunications system.

UDM 235 includes one or more devices that store user data and profiles in the wireless telecommunications system. UDM 235 may be used for fixed access and/or mobile access in core network 215.

PCF 240 includes one or more devices that provide a policy framework that incorporates network slicing, roaming, packet processing, and/or mobility management, among other examples.

AF 245 includes one or more devices that support application influence on traffic routing, access to NEF 225, and/or policy control, among other examples.

AMF 250 includes one or more devices that act as a termination point for non-access stratum (NAS) signaling and/or mobility management, among other examples.

SMF 255 includes one or more devices that support the establishment, modification, and release of communication sessions in the wireless telecommunications system. For example, SMF 255 may configure traffic steering policies at UPF 260 and/or may enforce user equipment IP address allocation and policies, among other examples.

UPF 260 includes one or more devices that serve as an anchor point for intraRAT and/or interRAT mobility. UPF 260 may apply rules to packets, such as rules pertaining to packet routing, traffic reporting, and/or handling user plane QoS, among other examples.

Message bus 265 represents a communication structure for communication among the functional elements. In other words, message bus 265 may permit communication between two or more functional elements. In some implementations, message bus 265 may be viewed as and/or associated with a transport interface between network functions.

Data network 270 includes one or more wired and/or wireless data networks. For example, data network 270 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
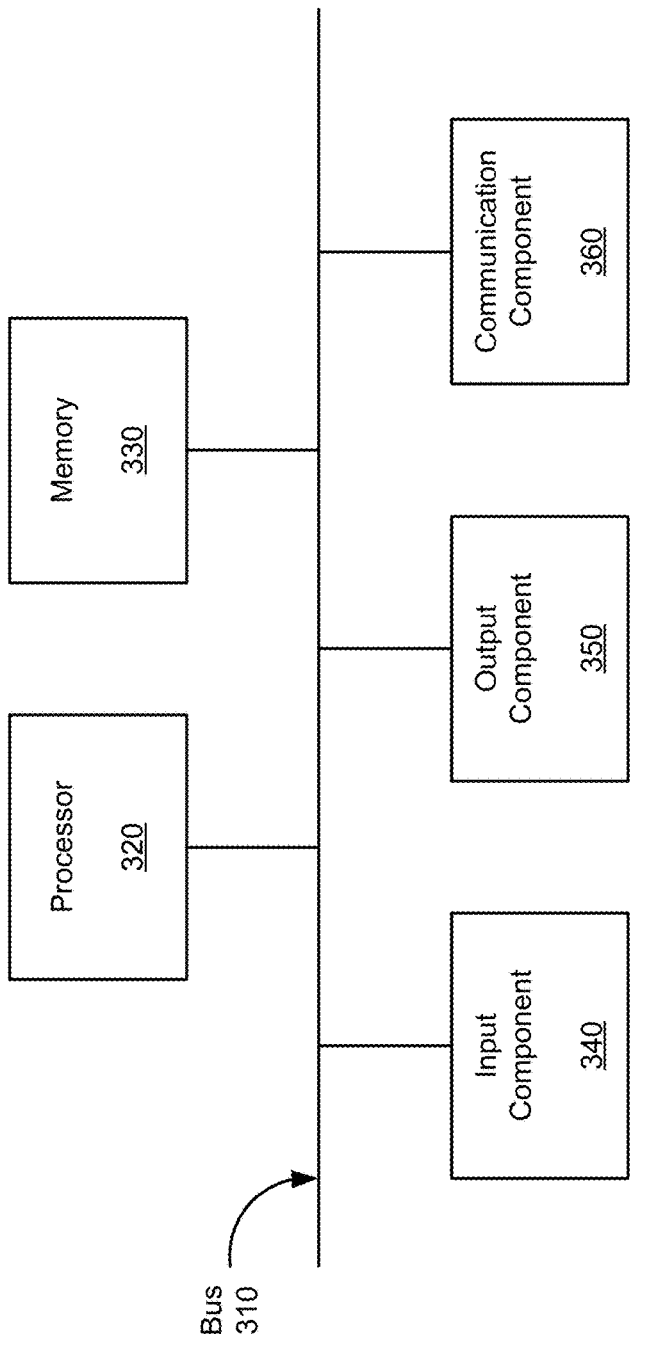
FIG. 3 is a diagram of example components of a device associated with TDD slot pattern determination.

FIG. 3 is a diagram of example components of a device 300 associated with TDD slot pattern determination. Device 300 may correspond to the UE 205, the RAN 210, the NSSF 220, the NEF 225, the NRF 227, the AUSF 230, the UDM 235, the PCF 240, the AF 245, the AMF 250, the SMF 255, and/or the UPF 260. In some implementations, the UE 205, the RAN 210, the NSSF 220, the NEF 225, the NRF 227, the AUSF 230, the UDM 235, the PCF 240, the AF 245, the AMF 250, the SMF 255, and/or the UPF 260 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
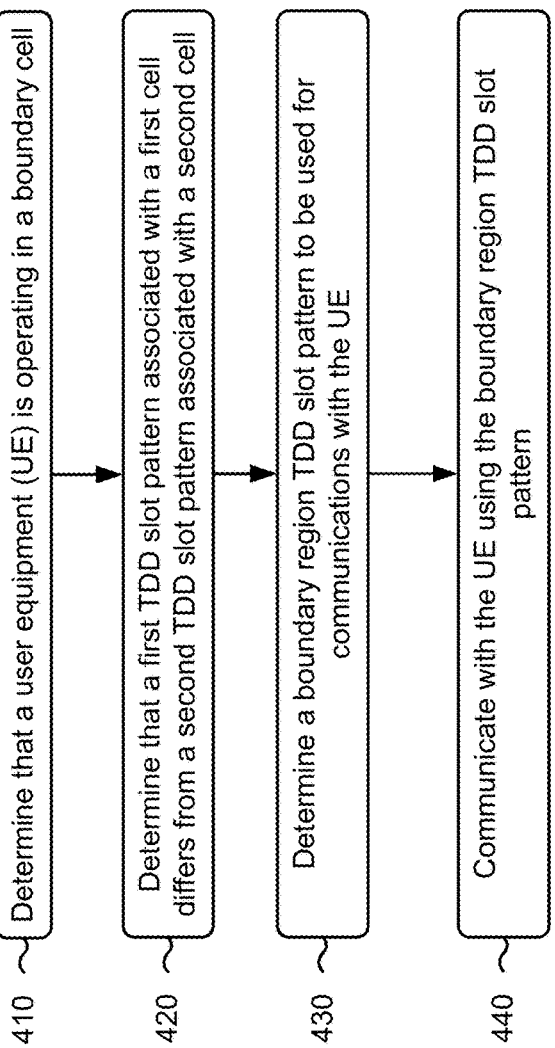
FIG. 4 is a flowchart of an example process associated with TDD slot pattern determination.

FIG. 4 is a flowchart of an example process 400 associated with TDD slot pattern determination. In some implementations, one or more process blocks of FIG. 4 may be performed by a network device (e.g., one of onsite network device 105, macro network device 110, network device 132, or another network device). In some implementations, one or more process blocks of FIG. 4 may be performed by another device or a group of devices separate from or including the network device, such as a UE (e.g., UE 205), a RAN (e.g., RAN 210), an NSSF (e.g., NSSF 220), an NEF (e.g., NEF 225), an NRF (e.g., NRF 227), an AUSF (e.g., AUSF 230), a UDM (e.g., UDM 235), a PCF (e.g., PCF 240), an AF (e.g., AF 245), an AMF (e.g., AMF 250), an SMF (e.g., SMF 255), and/or a UPF (e.g., UPF 260). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include determining that a UE is operating in coverage of a boundary cell (block 410). In some implementations, the boundary cell may be associated with overlapping coverage provided by a first cell and a second cell. For example, the network device may determine that a UE is operating in coverage of a boundary cell associated with overlapping coverage provided by a first cell and a second cell, as described above. In some implementations, the network device determines that the UE is operating in the coverage of the boundary cell based on one of a location of the UE, an indication received from the UE, or an indication received from another network device. For example, in some implementations, the network device determines that the UE is operating in the coverage of the boundary cell based on the indication received from the other network device, with the other network device being a smart repeater device.

As further shown in FIG. 4, process 400 may include determining that a first TDD slot pattern differs from a second TDD slot pattern (block 420). In some implementations, the first TDD slot pattern may be associated with the first cell and the second TDD slot pattern may be associated with the second cell. For example, the network device may determine that a first TDD slot pattern associated with the first cell differs from a second TDD slot pattern associated with the second cell, as described above.

As further shown in FIG. 4, process 400 may include determining a boundary region TDD slot pattern to be used for communications with the UE within the coverage of the boundary cell (block 430). In some implementations, the boundary region TDD slot pattern may be based on at least one of the first TDD slot pattern or the second TDD slot pattern. For example, the network device may determine a boundary region TDD slot pattern to be used for communications with the UE within the coverage of the boundary cell based on at least one of the first TDD slot pattern or the second TDD slot pattern, as described above. In some implementations, the boundary region TDD slot pattern is the first TDD slot pattern or the second TDD slot pattern, while, in some other implementations, the boundary region TDD slot pattern is different from the first TDD slot pattern and the second TDD slot pattern. Additionally, or alternatively, in some implementations, the boundary region TDD slot pattern is based on a combination of the first TDD slot pattern and the second TDD slot pattern.

As further shown in FIG. 4, process 400 may include communicating with the UE using the boundary region TDD slot pattern (block 440). For example, the network device may communicate with the UE using the boundary region TDD slot pattern, as described above. In some implementations, at least one uplink symbol of one of the first TDD slot pattern or the second TDD slot pattern overlaps with at least one downlink symbol of the other one of the first TDD slot pattern or the second TDD slot pattern. Accordingly, in some implementations, communicating, by the network device, with the UE using the boundary region TDD slot pattern includes not granting an uplink communication in the at least one uplink symbol and not scheduling a downlink communication in the at least one downlink symbol.

In some implementations, process 400 includes determining, by the first network device, that the UE is operating in another boundary cell associated with the overlapping coverage provided by the first cell and the second cell, and determining, by the network device, another boundary region TDD slot pattern to be used for communications with the UE within the other boundary cell based on at least one of the first TDD slot pattern or the second TDD slot pattern, with the other boundary region TDD slot pattern being different than the boundary region TDD slot pattern. The process 400 may also include communicating, by the network device, with the UE using the other boundary region TDD slot pattern.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

determining, by a network device, that a user equipment (UE) is operating in coverage of a boundary cell associated with overlapping coverage provided by a first cell and a second cell, wherein the first cell provides coverage to a quantity of subscribers located in a geographic area and the second cell provides coverage to a quantity of subscribers located in a building;

determining, by the network device, that a first time division duplex (TDD) slot pattern associated with the first cell differs from a second TDD slot pattern associated with the second cell, wherein a quantity of downlink slots in the first TDD slot pattern is greater than a quantity of downlink slots in the second TDD slot pattern;

determining, by the network device, a boundary region TDD slot pattern to be used for communications with the UE within the coverage of the boundary cell based on at least one of the first TDD slot pattern or the second TDD slot pattern;

communicating, by the network device, with the UE using the boundary region TDD slot pattern; and determining, by the network device, that the UE is operating in coverage of another boundary cell associated with the overlapping coverage provided by the first cell and the second cell, wherein another boundary region TDD slot pattern for the other boundary cell is different than the boundary region TDD slot pattern.

2. The method of claim 1, wherein at least one uplink symbol of one of the first TDD slot pattern or the second TDD slot pattern overlaps with at least one downlink symbol of the other one of the first TDD slot pattern or the second TDD slot pattern, and wherein communicating, by the network device, with the UE using the boundary region TDD slot pattern includes not granting an uplink communication in the at least one uplink symbol and not scheduling a downlink communication in the at least one downlink symbol.

3. The method of claim 1, wherein the boundary region TDD slot pattern is the first TDD slot pattern or the second TDD slot pattern.

4. The method of claim 1, wherein the boundary region TDD slot pattern is different from the first TDD slot pattern and the second TDD slot pattern.

5. The method of claim 4, wherein the boundary region TDD slot pattern is based on a combination of the first TDD slot pattern and the second TDD slot pattern.

6. The method of claim 1, further comprising:

determining, by the network device, the other boundary region TDD slot pattern, wherein the other boundary region TDD slot pattern is to be used for communications with the UE within the coverage of the other boundary cell based on at least one of the first TDD slot pattern or the second TDD slot pattern; and communicating, by the network device, with the UE using the other boundary region TDD slot pattern.

7. The method of claim 1, wherein the network device determines that the UE is operating in the coverage of the boundary cell based on one of:

a location of the UE, an indication received from the UE, or an indication received from another network device.

8. The method of claim 7, wherein the network device determines that the UE is operating in the coverage of the boundary cell based on the indication received from the other network device, and wherein the other network device is a smart repeater device.

9. The method of claim 1, further comprising determining, by the network device, that one or more additional UEs are operating in the coverage of the boundary cell, wherein determining the boundary region TDD slot pattern to be used for the communications with the UE is further based on the one or more additional UEs operating in the coverage of the boundary cell.

10. A network device, comprising:

one or more processors configured to:

determine that a user equipment (UE) is operating in coverage of a boundary cell associated with overlapping coverage provided by a first cell and a second cell, wherein the first cell provides coverage to a quantity of subscribers located in a geographic area and the second cell provides coverage to a quantity of subscribers located in a building;

determine that a first time division duplex (TDD) slot pattern associated with the first cell differs from a second TDD slot pattern associated with the second cell, wherein a quantity of downlink slots in the first TDD slot pattern is greater than a quantity of downlink slots in the second TDD slot pattern;

determine a boundary region TDD slot pattern to be used for communications with the UE within the coverage of the boundary cell based on at least one of the first TDD slot pattern or the second TDD slot pattern;

communicate with the UE using the boundary region TDD slot pattern; and determine that the UE is operating in coverage of another boundary cell associated with the overlapping coverage provided by the first cell and the second cell, wherein another boundary region TDD slot pattern for the other boundary cell is different than the boundary region TDD slot pattern.

11. The network device of claim 10, wherein at least one uplink symbol of one of the first TDD slot pattern or the second TDD slot pattern overlaps with at least one downlink symbol of the other one of the first TDD slot pattern or the second TDD slot pattern, and wherein communicating, by the network device, with the UE using the boundary region TDD slot pattern includes not granting an uplink communication in the at least one uplink symbol and not scheduling a downlink communication in the at least one downlink symbol.

12. The network device of claim 10, wherein the boundary region TDD slot pattern is the first TDD slot pattern or the second TDD slot pattern.

13. The network device of claim 10, wherein the boundary region TDD slot pattern is different from the first TDD slot pattern and the second TDD slot pattern.

14. The network device of claim 10, wherein the one or more processors are further configured to:

determine the other boundary region TDD slot pattern, wherein the other boundary region TDD slot pattern is to be used for communications with the UE within the coverage of the other boundary cell based on at least one of the first TDD slot pattern or the second TDD slot pattern, and communicate with the UE using the other boundary region TDD slot pattern.

15. The network device of claim 10, wherein the network device determines that the UE is operating in the coverage of the boundary cell based on one of:

a location of the UE, an indication received from the UE, or an indication received from another network device.

16. A non-transitory computer-readable medium storing a set of instructions, the set of instructions comprising:

one or more instructions that, when executed by one or more processors of a network device, cause the network device to:

determine that a user equipment (UE) is operating in coverage of a boundary cell associated with overlapping coverage provided by a first cell and a second cell, wherein the first cell provides coverage to a quantity of subscribers located in a geographic area and the second cell provides coverage to a quantity of subscribers located in a building;

determine that a first time division duplex (TDD) slot pattern associated with the first cell differs from a second TDD slot pattern associated with the second cell, wherein a quantity of downlink slots in the first TDD slot pattern is greater than a quantity of downlink slots in the second TDD slot pattern;

determine a boundary region TDD slot pattern to be used for communications with the UE within the coverage of the boundary cell based on at least one of the first TDD slot pattern or the second TDD slot pattern;

communicate with the UE using the boundary region TDD slot pattern; and determine that the UE is operating in coverage of another boundary cell associated with the overlapping coverage provided by the first cell and the second cell, wherein another boundary region TDD slot pattern for the other boundary cell is different than the boundary region TDD slot pattern.

17. The non-transitory computer-readable medium of claim 16, wherein at least one uplink symbol of one of the first TDD slot pattern or the second TDD slot pattern overlaps with at least one downlink symbol of the other one of the first TDD slot pattern or the second TDD slot pattern, and wherein communicating, by the network device, with the UE using the boundary region TDD slot pattern includes not granting an uplink communication in the at least one uplink symbol and not scheduling a downlink communication in the at least one downlink symbol.

18. The non-transitory computer-readable medium of claim 16, wherein the boundary region TDD slot pattern is the first TDD slot pattern or the second TDD slot pattern.

19. The non-transitory computer-readable medium of claim 16, wherein the boundary region TDD slot pattern is different from the first TDD slot pattern and the second TDD slot pattern.

20. The non-transitory computer-readable medium of claim 16, wherein the network device determines that the UE is operating in the coverage of the boundary cell based on one of:

a location of the UE, an indication received from the UE, or an indication received from another network device.

* * * * *